US010362489B1

(12) United States Patent
Desai et al.

(10) Patent No.: US 10,362,489 B1
(45) Date of Patent: Jul. 23, 2019

(54) CHANNELIZATION OF WIRELESS COMMUNICATION NETWORK IN PRESENCE OF INTERFERENCE

(71) Applicant: Cisco Technology, Inc., San Jose, CA (US)

(72) Inventors: Vishal S. Desai, San Jose, CA (US); Amir H. Kamalizad, Menlo Park, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/953,004

(22) Filed: Apr. 13, 2018

(51) Int. Cl.
*H04W 72/00* (2009.01)
*H04W 16/14* (2009.01)
*H04W 72/08* (2009.01)
*H04W 72/04* (2009.01)

(52) U.S. Cl.
CPC ....... *H04W 16/14* (2013.01); *H04W 72/0453* (2013.01); *H04W 72/08* (2013.01)

(58) Field of Classification Search
CPC .. H04W 16/14; H04W 72/0453; H04W 72/08
USPC ........................................................ 455/454
See application file for complete search history.

(56) References Cited

U.S. PATENT DOCUMENTS

| 2003/0181213 | A1* | 9/2003 | Sugar | H04W 16/14 |
| | | | | 455/454 |
| 2006/0148482 | A1 | 7/2006 | Mangold | |
| 2008/0075033 | A1* | 3/2008 | Shattil | H04B 7/026 |
| | | | | 370/328 |
| 2012/0170556 | A1 | 7/2012 | Tsfati et al. | |
| 2014/0146924 | A1* | 5/2014 | Shattil | H04B 7/026 |
| | | | | 375/340 |
| 2015/0023202 | A1* | 1/2015 | Shattil | H04W 52/267 |
| | | | | 370/252 |
| 2016/0073403 | A1* | 3/2016 | Kloper | H04L 1/00 |
| | | | | 370/329 |
| 2016/0081056 | A1 | 3/2016 | Barriac et al. | |

(Continued)

OTHER PUBLICATIONS

Ho, et al., "Chapter 2: Requirements and Regulations in the 5 GHz Unlicensed Spectrum", Long Term Evolution in Unlicensed Bands, SpringerBriefs in Electrical and Computer Engineering, ISBN: 978-3-319-47345-1, 2017, 11 pgs.

*Primary Examiner* — Khoi H Tran
*Assistant Examiner* — B M M Hannan
(74) *Attorney, Agent, or Firm* — Edell, Shapiro & Finnan, LLC

(57) ABSTRACT

Techniques for channelization of a wireless communication network in the presence of interference are described. In one embodiment, a method includes detecting an unlicensed wireless wide area network signal. The method includes selecting a wireless channel for a wireless local area network that includes frequencies associated with the unlicensed signal. The method includes allocating a first portion of the wireless channel that includes frequencies associated with the unlicensed signal to a first plurality of resource units and allocating a second portion of the wireless channel that excludes frequencies associated with the unlicensed signal to a second plurality of resource units. The method includes assigning the first plurality of resource units to a first group of client devices, and assigning the second plurality of resource units to a second group of client devices.

20 Claims, 10 Drawing Sheets

(56) References Cited

U.S. PATENT DOCUMENTS

| | | |
|---|---|---|
| 2016/0119924 A1 | 4/2016 | Lindoff et al. |
| 2016/0135189 A1 | 5/2016 | Chandrasekhar et al. |
| 2016/0142158 A1* | 5/2016 | Li .................. H04L 27/2613 455/63.1 |
| 2017/0094651 A1* | 3/2017 | Green ................ H04W 72/048 |

* cited by examiner

CHANNELIZATION OF WIRELESS COMMUNICATION NETWORK IN PRESENCE OF INTERFERENCE

TECHNICAL FIELD

This disclosure relates to wireless communication networks.

BACKGROUND

Long-Term Evolution-Unlicensed (LTE-U) is an adaptation of the LTE standard that operates in unlicensed frequency bands. As currently defined by the $3^{rd}$ Generation Partnership Project (3GPP), LTE-U targets 5 GHz and other unlicensed frequency bands. In addition, other unlicensed wireless wide area networks, including Licensed Assisted Access (LAA) and MulteFire, also use frequency bands in the 5 GHz range. As a consequence, LTE-U, LAA, MulteFire, and other unlicensed wireless wide area network technologies, operate in some of the same frequency bands defined for the IEEE 802.11 or Wi-Fi® standard, e.g., the 5 GHz frequency bands. The spectrum overlap between unlicensed wireless wide area networks and Wi-Fi can present spectrum access and interference problems for Wi-Fi and wireless access points for LTE-U, LAA, MulteFire, etc. that are concurrently operating within transmission range of each other in a given geographical region. Presently, there is no generally accepted, standardized channel assignment/selection protocol to mitigate interference between the concurrently operating unlicensed wireless wide area networks and Wi-Fi access points.

DESCRIPTION OF EXAMPLE EMBODIMENTS

Overview

Figure 1:
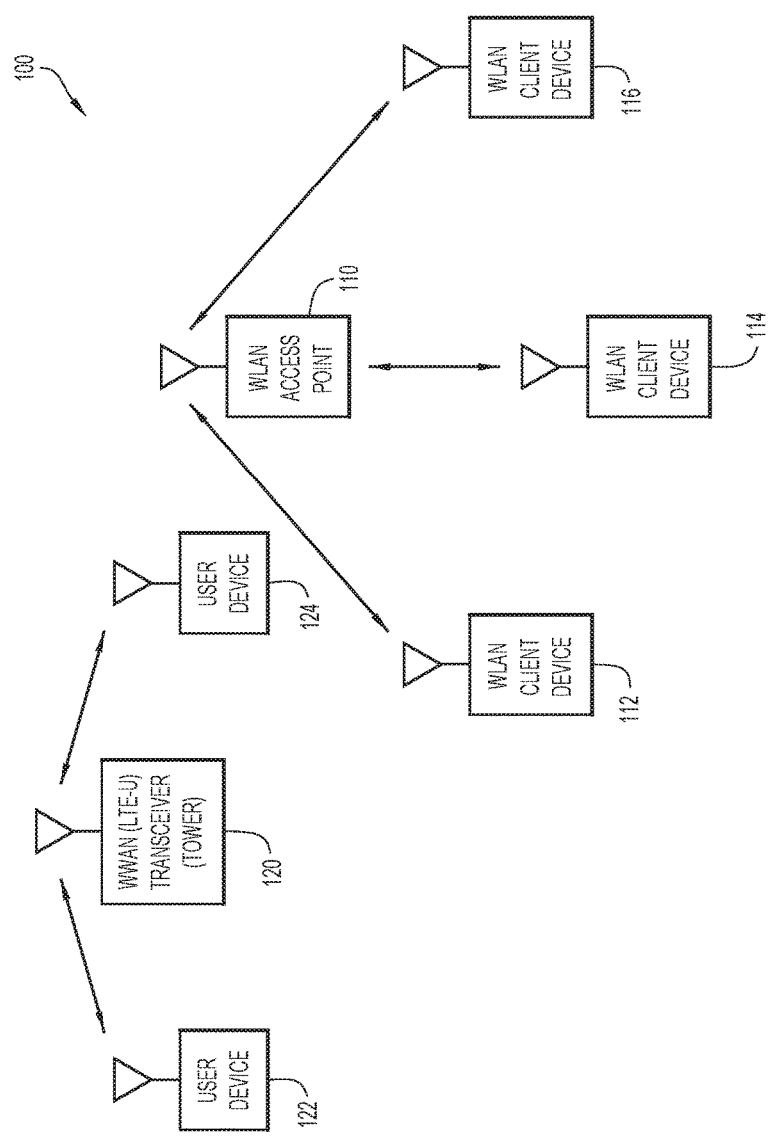
FIG. 1 is a diagram illustrating an environment in which channelization of a wireless communication network in the presence of interference may be implemented, according to an example embodiment.

Presented herein are techniques for channelization of a wireless communication network in the presence of interference. In an example embodiment, a method includes detecting, at a wireless access device operating a wireless local area network, at least one unlicensed wireless wide area network signal. Based on information associated with a preamble of the at least one unlicensed wireless wide area network signal, the method further includes determining a bandwidth of the at least one unlicensed wireless wide area network signal. The method includes selecting a wireless channel for the wireless local area network that includes frequencies associated with the at least one unlicensed wireless wide area network signal. The wireless channel is associated with a channel bandwidth that is greater than or equal to the bandwidth of the at least one unlicensed wireless wide area network signal. The method further includes allocating a first portion of the wireless channel to a first plurality of resource units. The first portion of the wireless channel includes frequencies associated with the at least one unlicensed wireless wide area network signal and has a first bandwidth that is greater than or equal to the bandwidth of the at least one unlicensed wireless wide area network signal. The method also includes allocating a second portion of the wireless channel to a second plurality of resource units. The second portion of the wireless channel excludes frequencies associated with the at least one unlicensed wireless wide area network signal and has a second bandwidth. The second bandwidth is less than or equal to a difference between the channel bandwidth and the first bandwidth. The method includes detecting a plurality of client devices in communication with the wireless access device, assigning the first plurality of resource units to a first group of the plurality of client devices to exchange data using the first portion of the wireless channel, and assigning the second plurality of resource units to a second group of the plurality of client devices to exchange data using the second portion of the wireless channel.

Example Embodiments

Unlicensed wireless wide area networks, including technologies such as LTE-U, Licensed Assisted Access (LAA), and MulteFire, are rapidly being deployed across the United States and other countries around the world. As a result, these unlicensed wireless wide area network technologies are creating increasing amounts of disruption to wireless access points operating wireless local area networks, such as Wi-Fi networks, due to overlapping frequencies. As a result of aggressive listen-before-transmit (LBT) and robust coding schemes, unlicensed wireless wide area network technologies introduce a high degree of co-channel contention, especially within the 5 GHz spectrum. This contention can bring down overall capacity of the wireless local area network spectrum, resulting in degraded performance of wireless local area network radios and associated devices.

With the growing adoption of unlicensed wireless wide area network technologies, there is a need to ensure that wireless access points for wireless local area networks mitigate contention introduced by the unlicensed wireless wide area network technologies to the spectrum used by wireless local area networks. Furthermore, mitigating this contention will also assist with fully taking advantage of the benefits of implementing Institute of Electrical and Electronics Engineers (IEEE) 802.11ax High-Efficiency Wireless (HEW) standards for wireless access points.

According to the principles of the example embodiments described herein, techniques for enhanced channelization of a wireless communication network in the presence of interference from unlicensed wireless wide area network signals are presented that mitigate contention caused by unlicensed wireless wide area network technologies on the spectrum used by wireless local area networks.

FIG. 1 is a diagram illustrating an environment 100 in which channelization of a wireless communication network in the presence of interference may be implemented according to an example embodiment. In this embodiment, environment 100 includes a wireless access device 110, such as a wireless access point, for a wireless local area network (WLAN). Environment 100 may include a plurality of client devices connected to the wireless local area network through wireless access device 110, including a first client device 112, a second client device 114, and a third client device 116. Client devices 112, 114, 116 may include any user equipment or other devices configured to communicate using the wireless local area network, such as cell phones, tablets, printers, computers, consumer electronics, Internet-of-Things (IoT) devices, as well as other devices that include equipment to establish a connection with the wireless local area network. Some of these client devices 112, 114 and 116 may also have wireless wide area network connectivity capabilities.

The client devices 112, 114, 116 transmit data to and receive data from the wireless local area network via data transmissions to and from wireless access device 110. In various embodiments, wireless access device 110 is compliant with one or more IEEE 802.11 Wi-Fi standards, including, in an example embodiment, the IEEE 802.11ax standard. Accordingly, in various embodiments, the data transmissions to and from wireless access device 110 and client devices 112, 114, 116 are performed according to one or more IEEE 802.11 standards. Accordingly, in some embodiments, data transmissions to and from the wireless access device 110 and client devices 112, 114, 116 are, at least partially, in the unlicensed 5 GHz frequency band.

In this embodiment, environment 100 also includes a wireless wide area network (WWAN) transceiver or tower 120 for a wireless wide area network. Wireless wide area network is an unlicensed wireless wide area network, for example, LTE-U, Licensed Assisted Access (LAA), Multe-Fire, or other technology that transmits and/or receives signals within the unlicensed 5 GHz frequency band. Environment 100 also includes a plurality of user devices connected to the unlicensed wireless wide area network through wireless wide area network transceiver 120, including a first user device 122 and a second user device 124. In an example embodiment, first user device 122 and second user device 124 may be LTE-U devices configured to transmit data to and receive data from the unlicensed wireless wide area network via data transmissions to and from wireless wide area network transceiver 120. Accordingly, in some embodiments, data transmissions to and from wireless wide area network transceiver 120 and user devices 122, 124 are, at least partially, in the unlicensed 5 GHz frequency band.

In this embodiment, because the data transmissions to and from wireless access device 110 and the data transmissions to and from wireless wide area network transceiver 120 are, at least partially, in the same frequency band (e.g., within the unlicensed 5 GHz frequency band), the data transmissions to and from wireless wide area network transceiver 120 and user devices 122, 124 can be received as interference signals by wireless access device 110 and client devices 112, 114, 116.

The interference signals from wireless wide area network transceiver 120 and user devices 122, 124 have the potential to degrade performance of the data transmissions between wireless access device 110 and client devices 112, 114, 116. For example, in some embodiments, the interference signals may increase the bit error rate, increase the packet drop rate, or decrease the data rate. According to the example embodiments described herein, therefore, wireless access device 110 is configured to implement techniques for enhanced channelization of a wireless communication network in the presence of interference from unlicensed wireless wide area network signals. In particular, as described in detail below, wireless access device 110 may implement channelization in the presence of interference signals from unlicensed wireless wide area networks in different ways.

In the example embodiments, a wireless access device for a wireless local area network, for example, wireless access device 110, may use digital signal processing with signal monitoring mode function and/or software defined radio monitors to detect one or more unlicensed wireless wide area network signals on all off-channel frequencies (i.e., serving and non-serving frequencies). Moreover, information associated with the unlicensed wireless wide area network signals may be obtained from a preamble of the signal. For example, the information obtained from the preamble may include one or more of signal strength (e.g., received signal strength indicator (RSSI)), signal quality (e.g., signal to noise ratio (SNR)), and/or estimated duty cycle.

Each unlicensed wireless wide area network signal preamble is 1.25 MHz, for example. Bandwidth of the unlicensed wireless wide area network signal may be estimated using information obtained from the preamble of the unlicensed wireless wide area network signal, for example, by using frequency binning and Fast Fourier transform (FFT) techniques, and/or based on signal quality (e.g., SNR) and estimated duty cycle.

The information associated with the unlicensed wireless wide area network signals from the preamble and/or the estimated bandwidth of the signal may be provided to a dynamic channel assignment algorithm (DCA) of the wireless access device 110. The DCA may apply a negative bias to frequencies associated with interference signals from the unlicensed wireless wide area network devices, because such signals may cause lower channel quality metrics for client devices (e.g., client devices 112, 14, 116) communicating with wireless access device 110. The negative weights applied by the DCA of the wireless access device 110 are directly proportional to signal quality (e.g., SNR) and estimated duty cycle of the unlicensed wireless wide area network signals. Additionally, according to the principles of the embodiments described herein, wireless access device 110 is configured to implement techniques for enhanced channelization of the wireless communication network (e.g., the wireless local area network) in the presence of interference from the unlicensed wireless wide area network signals, as described below.

Positive Bias for DFS Frequencies

Figure 2:
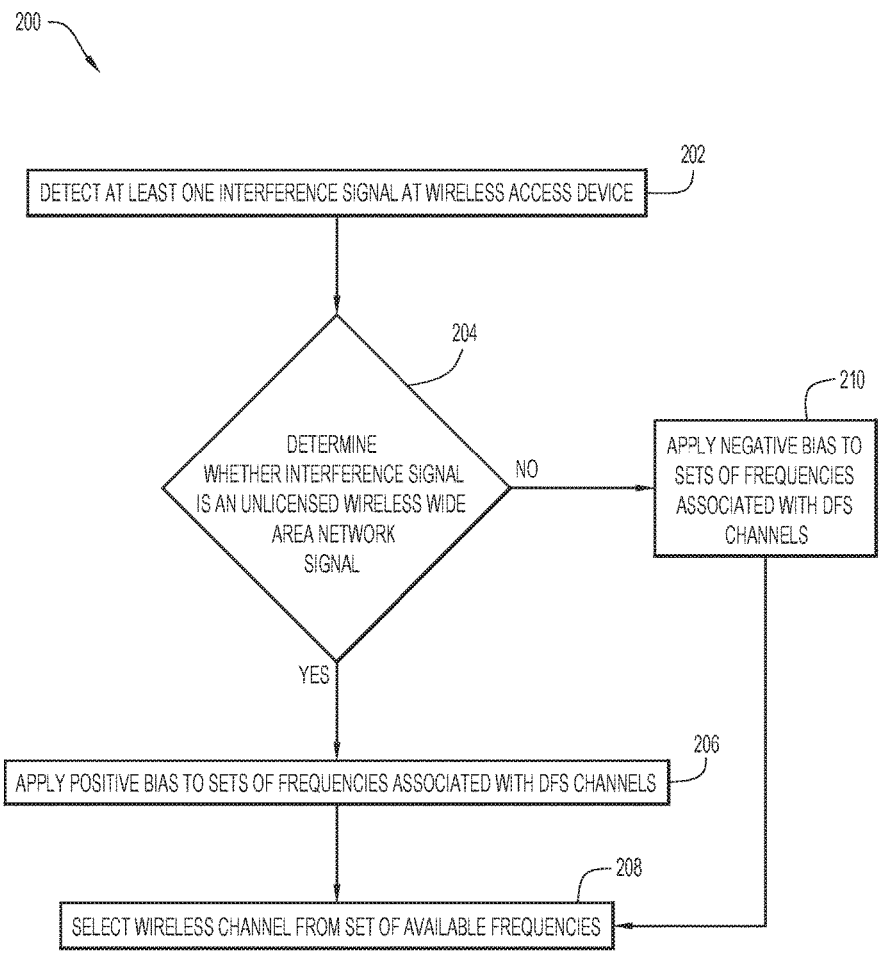
FIG. 2 is a flowchart illustrating a method of applying a positive bias towards dynamic frequency selection channels in the presence of interference, according to an example embodiment.

According to one example embodiment, a wireless access point (e.g., wireless access device 110) may be configured to apply a positive bias towards dynamic frequency selection (DFS) channels in the presence of interference associated with a wireless transmission in an unlicensed wireless wide area network. Referring now to FIG. 2, a flowchart of a method 200 of applying a positive bias towards dynamic frequency selection channels in the presence of interference is shown according to an example embodiment.

In this embodiment, method 200 includes an operation 202 of detecting at least one interference signal at a wireless access device, for example, wireless access device 110. Next, at an operation 204, the wireless access device determines whether the detected interference signal is an unlicensed wireless wide area network signal. For example, a signal from a device implementing LTE-U, LAA, MulteFire, or other technology/system that transmits and/or receives signals within the unlicensed 5 GHz frequency band.

Upon determining at operation 204 that the interference signal is an unlicensed wireless wide area network signal, method 200 proceeds to an operation 206, where a positive bias is applied to sets of frequencies associated with dynamic frequency selection channels. For example, the DCA of wireless access device 110 may apply the positive bias to sets of frequencies associated with dynamic frequency selection channels. Dynamic frequency selection (DFS), refers to a mechanism to allow unlicensed devices to share the 5 GHz frequency bands which have been allocated to radar systems without causing interference to those radars. In the United States, DFS is mandated for frequencies in the 5470-5725 MHz UNII band (see FIG. 3).

Next, at an operation 208, a wireless channel is selected from the sets of available frequencies for the wireless local area network. Because most of the unlicensed wireless wide area network signals are not established on the UNII-2 and Extended bands, the wireless local area network can avoid interference by using a wireless channel associated with the DFS channels. Therefore, wireless access devices and connected client devices in the presence of interference signals from unlicensed wireless wide area network devices can have a positive bias applied to sets of frequencies associated with DFS channels during channel selection so as to operate on the frequencies associated with the DFS channels. It should be noted that the selection at operation 208 need not be a binary decision, but may also leverage frequency binning to ensure that non-LTE signals are present on such DFS channel frequencies for a safety check.

Upon determining at operation 204, however, that the interference signal is not an unlicensed wireless wide area network signal, method 200 instead proceeds to an operation 210. At operation 210, a negative bias is applied to sets of frequencies associated with DFS channels. Next, at operation 208, a wireless channel is selected from the sets of available frequencies for the wireless local area network. Thus, in the absence of interference signals from unlicensed wireless wide area network devices, method 200 attempts to avoid selecting frequencies associated with the DFS channels.

Resource Unit Preference

The IEEE 802.11ax standard, referenced above, includes provisions to multiplex more users/devices in the same channel bandwidth using Orthogonal Frequency-Division Multiple Access (OFDMA) techniques. The IEEE 802.11ax standard assigns specific sets of subcarriers to individual users/devices. That is, it divides the existing 802.11 channels (20, 40, 80 and 160 MHz wide) into smaller sub-channels with a predefined number of subcarriers. The IEEE 802.11ax standard refers to the smallest sub channel as a Resource Unit (RU), with a minimum size of 26 subcarriers.

Figure 3:
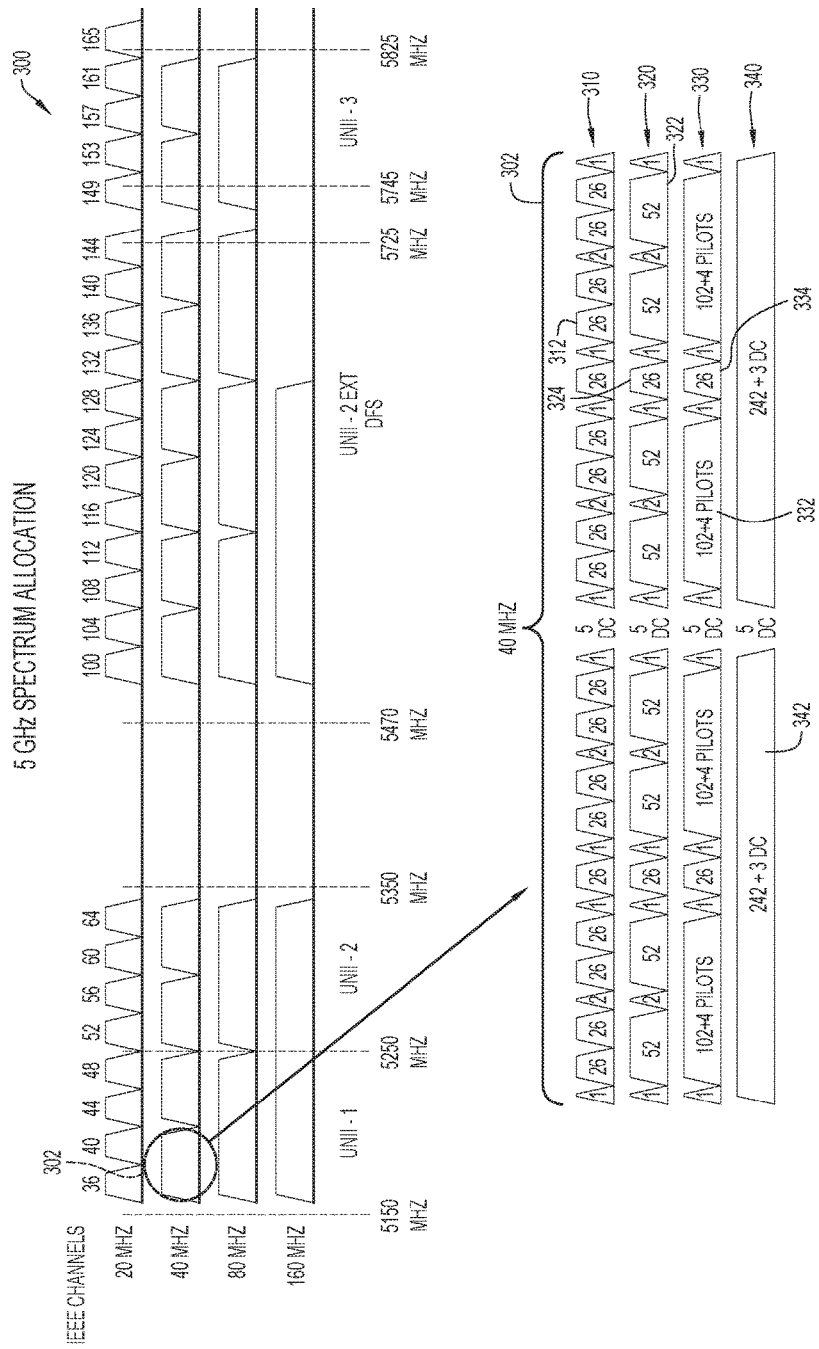
FIG. 3 is a diagram illustrating the 5 GHz spectrum allocation and a plurality of resource units within a representative 40 MHz channel, according to an example embodiment.

Referring now to FIG. 3, a diagram 300 illustrating the 5 GHz spectrum allocation and a plurality of resource units within a representative 40 MHz channel 302 is shown according to an example embodiment. In this embodiment, representative 40 MHz channel 302 may be divided into a plurality of resource units of different sizes. For example, a first set of resource units 310 may divide representative 40 MHz channel 302 into resource units 312 having the smallest available sub channel size (i.e., 26 subcarriers). Thus, first set of resource units 310 divides representative 40 MHz channel 302 into 18 resource units 312, each resource unit 312 having a size of 26 subcarriers.

In some embodiments, sizes of resource units may be larger. For example, a second set of resource units 320 may divide representative 40 MHz channel 302 into resource units 322 having a size of 52 subcarriers and resource units 324 having 26 subcarriers. Thus, second set of resource units 320 divides representative 40 MHz channel 302 into 8 resource units 322, each resource unit 322 having a size of 52 subcarriers, and 2 resource units 324, having a size of 26 subcarriers. In another example, a third set of resource units 330 may divide representative 40 MHz channel 302 into resource units 332 having a size of 102 subcarriers (and 4 pilots) and resource units 334 having 26 subcarriers. Thus, third set of resource units 330 divides representative 40 MHz channel 302 into 4 resource units 332, each resource unit 332 having a size of 102 subcarriers (and 4 pilots), and 2 resource units 334, having a size of 26 subcarriers. In a last example, a fourth set of resource units 340 may divide representative 40 MHz channel 302 into two resource units 342 having a size of 242 subcarriers each.

Based on multi-user traffic needs, a wireless access point (e.g., wireless access device 110) may decide how to allocate a channel. It may allocate the whole channel to only one device at a time, or it may partition the channel to serve multiple devices simultaneously (shown, for example, in FIG. 5, described below). Thus, in dense user environments where many devices would normally contend inefficiently for their turn to use the same channel, the OFDMA mechanism now serves them simultaneously with a smaller, dedicated sub channel, thus improving the average throughput per device.

Figure 4:
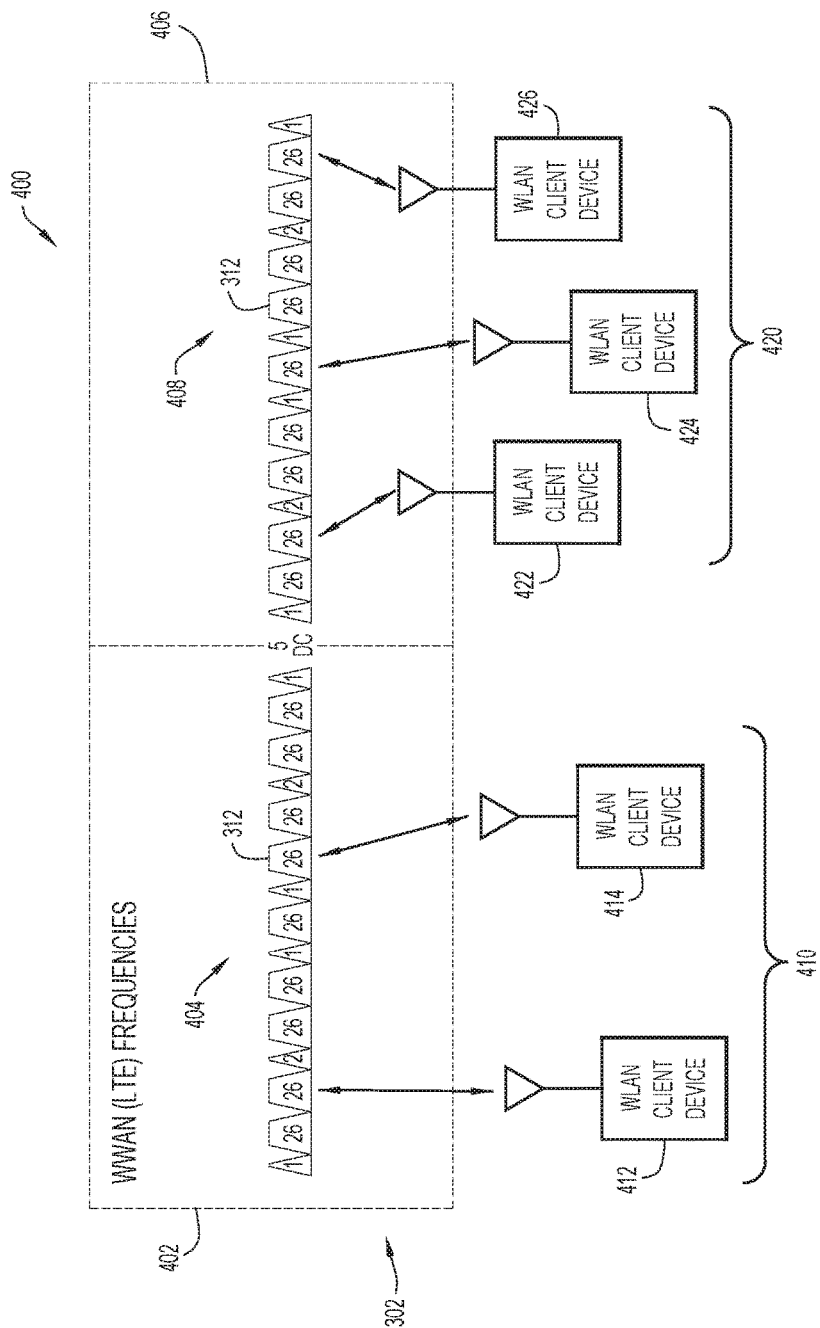
FIG. 4 is a diagram illustrating assignments of groups of client devices to resource units in the presence of interference, according to an example embodiment.

According to one example embodiment, a wireless access point (e.g., wireless access device 110) may be configured to apply a resource unit preference to high capacity or high necessity client devices in the presence of an unlicensed wireless wide area network to resource units that are clear from interference from the unlicensed wireless wide area network signals. Referring now to FIG. 4, an environment 400 in which assignments of groups of client devices to resource units in the presence of interference from unlicensed wireless wide area network signals is shown according to an example embodiment.

Unlicensed wireless wide area network signals have narrow bandwidths, for example, MulteFire is associated with a bandwidth of at least 10 MHz, and LTE-U and LAA is associated with a bandwidth of 20 MHz. Accordingly, a wireless local area network that uses a channel having a bandwidth of 40 MHz, 80 MHz, or 160 MHz, will have frequencies within that channel that exclude or are clear from interference from the unlicensed wireless wide area network signals. According to the example embodiments, once the bandwidth of the unlicensed wireless wide area network signal is determined, for example, as a function of the SNR and estimated duty cycle obtained from the preamble, resource units may be allocated within at least two portions of the wireless local area network channel: one portion clear of interference from the unlicensed wireless wide area network signals and the other portion including the frequencies of the unlicensed wireless wide area network signals. As will be further described below, client devices may be assigned into groups configured to use resource units of one portion of the channel or the other, based on a selection criterion.

Still referring to FIG. 4, in this embodiment, representative 40 MHz channel 302 is shown divided into a plurality of resource units 312. In an example embodiment, each resource unit 312 has a size of 26 subcarriers, thus dividing representative 40 MHz channel 302 into 18 individual resource units 312, as described above. It should be understood, that resource units of other sizes, such as described with reference to FIG. 3 above, may also be used.

Environment 400 includes interference signals from an unlicensed wireless wide area network, for example, from one or more LTE-U devices, with a maximum bandwidth of 20 MHz. In this case, since the bandwidth of the wireless local area network channel (e.g., representative 40 MHz channel 302) is larger than the bandwidth of the unlicensed wireless wide area network (i.e., 20 MHz), the wireless local area network channel may include a portion that overlaps the interference signals and a portion that is clear from the interference signals. In this embodiment, representative 40 MHz channel 302 includes a first portion 402 that includes frequencies associated with the at least one unlicensed wireless wide area network signal and a second portion 406 that excludes frequencies associated with the at least one unlicensed wireless wide area network signal.

The plurality of resource units 312 may then be allocated between the two portions of the wireless local area network channel (e.g., first portion 402 and second portion 406 of representative 40 MHz channel 302). For example, in this embodiment, a first plurality of resource units 404 may be allocated to first portion 402 of representative 40 MHz channel 302 that includes frequencies associated with the at least one unlicensed wireless wide area network signal. A second plurality of resource units 408 may be allocated to second portion 406 of representative 40 MHz channel 302 that excludes frequencies associated with the at least one unlicensed wireless wide area network signal.

Client devices on the wireless local area network channel may be assigned to one of at least two different groups based on a selection criterion. For example, the selection criterion may be data/network capacity requirements for the client device, where a higher capacity requirement is given preference over a lower capacity requirement. Examples of low capacity requirement client devices may include printers, tags, IoT devices or other client devices that only require periodic, infrequent, and/or minimal access to the wireless local area network.

In this embodiment, client devices on the wireless local area network include a first group of devices 410 assigned to use first plurality of resource units 404 and a second group of devices 420 assigned to use second plurality of resource units 408. That is, in this embodiment, second group of devices 420 are considered to have higher capacity requirements than first group of devices 410. First group of devices 410 includes a first client device 412 and a second client device 414. Second group of devices 420 includes a third client device 422, a fourth client device 424, and a fifth client device 426. Thus, as shown in FIG. 4, a wireless access point (e.g., wireless access device 110) has applied a resource unit preference to high capacity or high necessity client devices (e.g., second group of devices 420) in the presence of an unlicensed wireless wide area network to resource units (e.g., second plurality of resource units 408) that are clear from interference from the unlicensed wireless wide area network signals.

Figure 5:
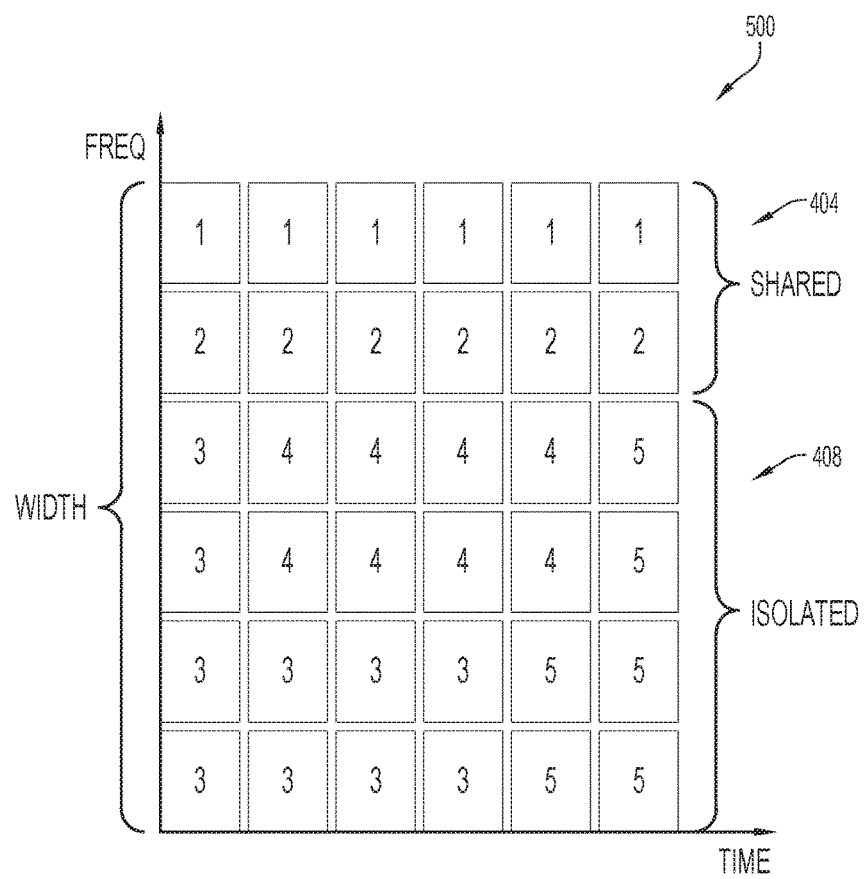
FIG. 5 is a diagram illustrating assignment of groups of client devices to resource units with time multiplexing in the presence of interference, according to an example embodiment.

FIG. 5 is a diagram 500 illustrating assignment of groups of client devices 410, 420 to resource units with time multiplexing in the presence of interference, according to an example embodiment. In this embodiment, diagram 500 shows first plurality of resource units 404 and second plurality of resource units 408. As described above in reference to FIG. 4, first plurality of resource units 404 share first portion 402 of representative 40 MHz channel 302 with frequencies associated with the at least one unlicensed wireless wide area network signal. Whereas, second plurality of resource units 408 are isolated to second portion 406 of representative 40 MHz channel 302 that excludes frequencies associated with the at least one unlicensed wireless wide area network signal.

Accordingly, in this embodiment, first group of devices 410, including first client device 412 and second client device 414, may transmit and receive data transmissions using first plurality of resource units 404. For example, as shown in FIG. 5, diagram 500 includes time-multiplexed blocks of plurality of resource units 404 that are used by first client device 412 (i.e., blocks labeled "1") and second client device 414 (i.e., blocks labeled "2") to transmit and receive data transmissions over the shared portion of representative 40 MHz channel 302 (i.e., first portion 402). Also in this embodiment, second group of devices 420, including third client device 422, fourth client device 424, and fifth client device 426, may transmit and receive data transmissions using second plurality of resource units 408. As shown in FIG. 5, diagram 500 includes time-multiplexed blocks of second plurality of resource units 408 that are used by third client device 422 (i.e., blocks labeled "3"), fourth client device 424 (i.e., blocks labeled "4"), and fifth client device 426 (i.e., blocks labeled "5") to transmit and receive data transmissions over the isolated portion of representative 40 MHz channel 302 (i.e., second portion 406).

Figure 6:
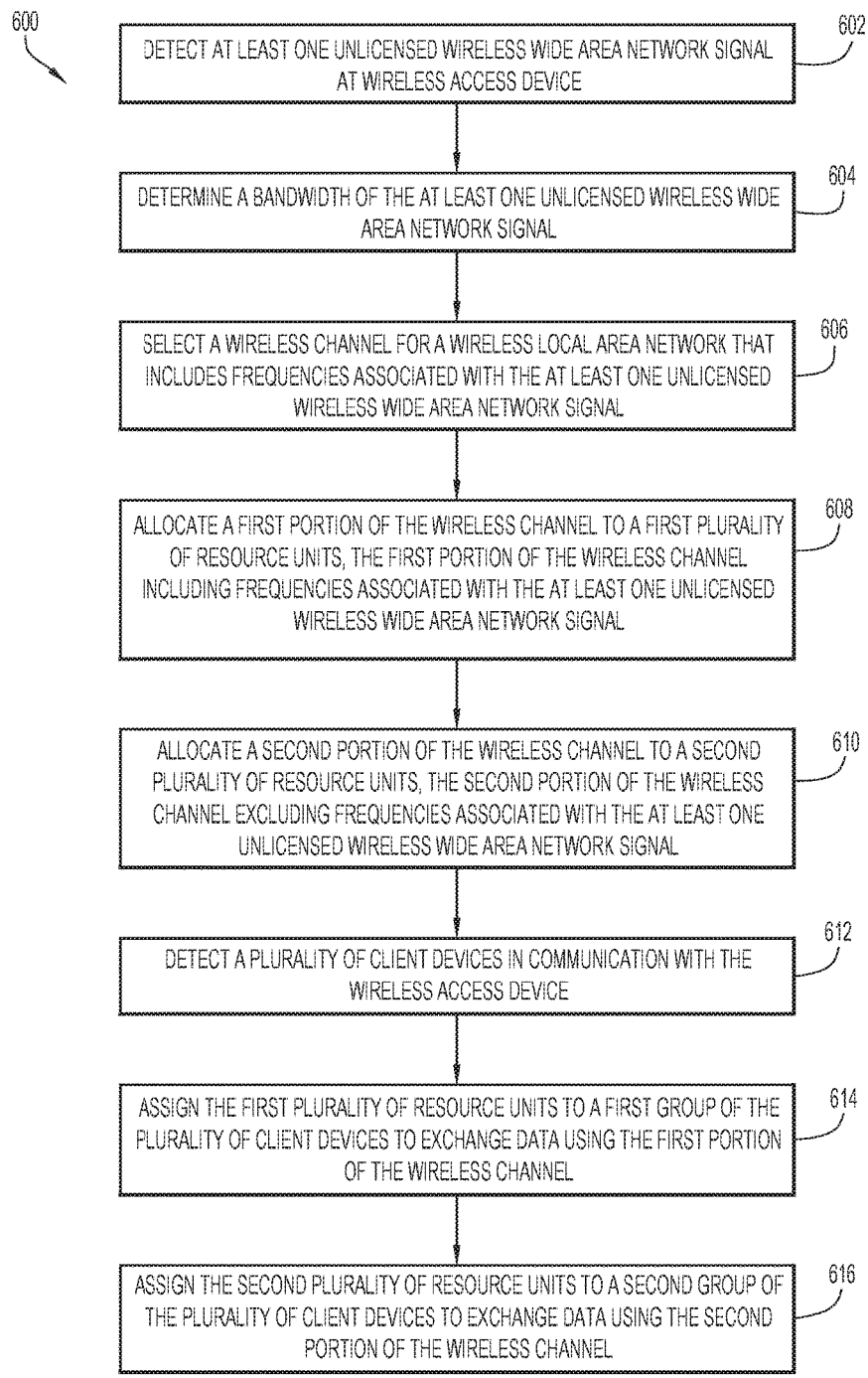
FIG. 6 is a flowchart of a method for assigning groups of client devices to resource units in the presence of interference, according to an example embodiment.

FIG. 6 is a flowchart of a method 600 for assigning groups of client devices to resource units in the presence of interference, according to an example embodiment. In an example embodiment, method 600 may be implemented by wireless access device 110. In this embodiment, method 600 may begin at an operation 602, where at least one unlicensed wireless wide area network signal is detected by wireless access device 110. For example, as described above, wireless access device 110 detects a signal from a device implementing LTE-U, LAA, MulteFire, or other technology that transmits and/or receives signals within the unlicensed 5 GHz frequency band.

Next, at an operation 604, the bandwidth of the at least one unlicensed wireless wide area network signal is determined. Wireless access device 110 may use information associated with the preamble of the at least one unlicensed wireless wide area network signal to determine the signal bandwidth at operation 604. For example, the bandwidth may be determined based on signal quality (e.g., SNR) and estimated duty cycle information obtained from the preamble of the signal, as described above.

At an operation 606, a wireless channel for a wireless local area network is selected that includes frequencies associated with the at least one unlicensed wireless wide area network signal. The wireless channel selected has a channel bandwidth that is larger than the bandwidth of the at least one unlicensed wireless wide area network signal. For example, as described above in reference to FIGS. 3 and 4, unlicensed wireless wide area networks have narrow bandwidths, for example, from 10 MHz to 20 MHz. The wireless channel selected at operation 606, therefore, will have a channel bandwidth of 40 MHz, 80 MHz, or 160 MHz so that it is larger than the bandwidth of the unlicensed wireless wide area network signal.

Next, at an operation 608, a first portion of the wireless channel is allocated to a first plurality of resource units. The first portion of the wireless channel includes frequencies associated with the at least one unlicensed wireless wide area network signal and has a first bandwidth that is greater than or equal to the bandwidth of the at least one unlicensed wireless wide area network signal. That is, the first portion of the wireless channel is allocated such that its bandwidth as at least as wide as the bandwidth of the unlicensed wireless wide area network signal. In this manner, the first portion of the wireless channel may be shared with the unlicensed wireless wide area network signals. For example, first portion 402 of representative 40 MHz channel 302 allocated to first plurality of resource units 404, as shown in FIG. 4.

At an operation 610, a second portion of the wireless channel is allocated to a second plurality of resource units. The second portion of the wireless channel excludes frequencies associated with the at least one unlicensed wireless wide area network signal and has a second bandwidth that is less or than or equal to a difference between the channel bandwidth and the first bandwidth. For example, second portion 406 of representative 40 MHz channel 302 is allocated to second plurality of resource units 408, as shown in FIG. 4.

Next, at an operation 610, a plurality of client devices in communication with the wireless access device are detected. For example, wireless access device 110 may detect a plurality of client devices including first client device 412, second client device 414, third client device 422, fourth client device 424, and fifth client device 426, as shown in FIG. 4.

The detected plurality of client devices from operation 610 may be associated with at least two groups of devices. For example, a selection criterion, such as data capacity requirements or priority, may be used to determine which client devices are associated with each group. In an example embodiment, client devices are grouped according to devices having higher capacity requirements than other devices that have lower capacity requirements.

Next, at an operation 614, the first plurality of resource units are assigned to a first group of client devices to exchange data using the first portion of the wireless channel. For example, first group of devices 410, including first device 412 and second device 414, may be assigned to use first plurality of resource units 404 to exchange data using first portion 402 of representative 40 MHz channel 302, as shown in FIG. 4. In this manner, first portion 402 of representative 40 MHz channel 302 is shared between first group of devices 410 and user devices associated with the unlicensed wireless wide area network.

At an operation 616, the second plurality of resource units are assigned to a second group of client devices to exchange data using the second portion of the wireless channel. For example, second group of devices 420, including third client device 422, fourth client device 424, and fifth client device 426, may be assigned to use second plurality of resource units 408 to exchange data using second portion 406 of representative 40 MHz channel 302, as shown in FIG. 4. In this manner, second portion 406 of representative 40 MHz channel 302 isolates second group of devices 420 from interference with user devices associated with the unlicensed wireless wide area network.

Frequency Avoidance Based on Client Compliance Type

As detailed above, IEEE 802.11 standards for Wi-Fi include a number of different standards, including, but not limited to 802.11b, 802.11a, 802.11g, 802.11n, 802.11ac, and 802.11ax, as well as other legacy and related standards. At this time, however, only the IEEE 802.11ax HEW standard is configured to provide for resource unit allocation. As a result, only client devices that are IEEE 802.11ax standard compliant may be configured to exchange data using allocated resource units within a wireless channel. For example, as described above with reference to FIGS. 3 through 6, if a majority of client devices are non-IEEE 802.11ax standard compliant or if a majority of client device traffic is coming from non-IEEE 802.11ax standard compliant devices, then optimizing allocation of resource units may not be possible or may provide little benefit or improvement.

According to one example embodiment, a wireless access point (e.g., wireless access device 110) may be configured to determine a type of wireless local area network compliance for each of a plurality of client devices connected to the wireless access point, and, based on the determination, implement techniques for enhanced channelization of a wireless communication network in the presence of interference from unlicensed wireless wide area network signals. For example, where a majority of client devices are IEEE 802.11ax standard compliant or if a majority of client device traffic is coming from IEEE 802.11ax standard compliant devices, then resource unit optimization, as described above in reference to FIGS. 3-6, may be applied. If, however, a majority of client devices are non-IEEE 802.11ax standard compliant or if a majority of client device traffic is coming from non-IEEE 802.11ax standard compliant devices, then resource unit optimization will provide little benefit. As a result, in such situations, the wireless access point (e.g., wireless access device 110) may be configured to avoid the frequency channel/bandwidth entirely and select a new channel for a wireless local area network that does not include frequencies associated with the unlicensed wireless wide area network signals.

Additionally, in the event that the unlicensed wireless wide area network signals have an adverse effect on an entire operational frequency, then the channel assignment algorithm (e.g., DCA) of the wireless access point (e.g., wireless access device 110) may be configured to avoid such frequency channel entirely and select a new operational frequency channel that has less interference signals from unlicensed wireless wide area network user devices.

Figure 7:
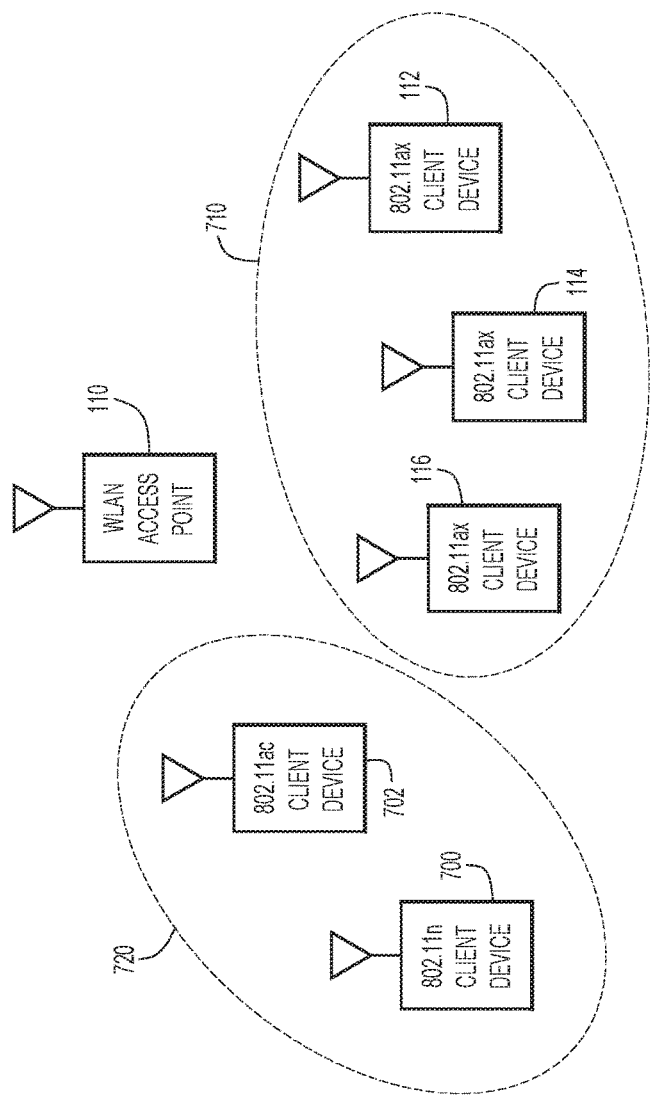
FIG. 7 is a diagram illustrating a wireless access point determining types of wireless local area network compliance for connected client devices, according to an example embodiment.

Referring now to FIG. 7, a diagram illustrating a wireless access point (e.g., wireless access device 110) determining types of wireless local area network compliance for connected client devices is shown according to an example embodiment. In this embodiment, wireless access device 110 is in communication with a plurality of client devices, including first client device 112, second client device 114, and third client device 116, described above. In addition, wireless access device 110 is also in communication with a fourth client device 700 and a fifth client device 702. In this embodiment, each of first client device 112, second client device 114, and third client device 116 are IEEE 802.11ax standard compliant devices. Accordingly, first client device 112, second client device 114, and third client device 116 may be associated with a first group 710 of IEEE 802.11ax standard compliant devices.

In this embodiment, fourth client device 700 is complaint with the IEEE 802.11n standard and fifth client device 702 is complaint with the IEEE 802.11ac standard. That is, fourth client device 700 and fifth client device 702 are complaint with previous types of IEEE 802.11 standards. Therefore, fourth client device 700 and fifth client device 702 may be associated with a second group 720 of non-IEEE 802.11ax standard compliant devices. In this case, first group 710 of IEEE 802.11ax standard compliant devices includes three client devices (e.g., first client device 112, second client device 114, and third client device 116) and second group 720 of non-IEEE 802.11ax standard compliant devices includes two client devices (e.g., fourth client device 700 and fifth client device 702). Therefore, in the embodiment of FIG. 7, a majority of the plurality of client devices connected to wireless access device 110 are IEEE 802.11ax compliant.

Figure 8:
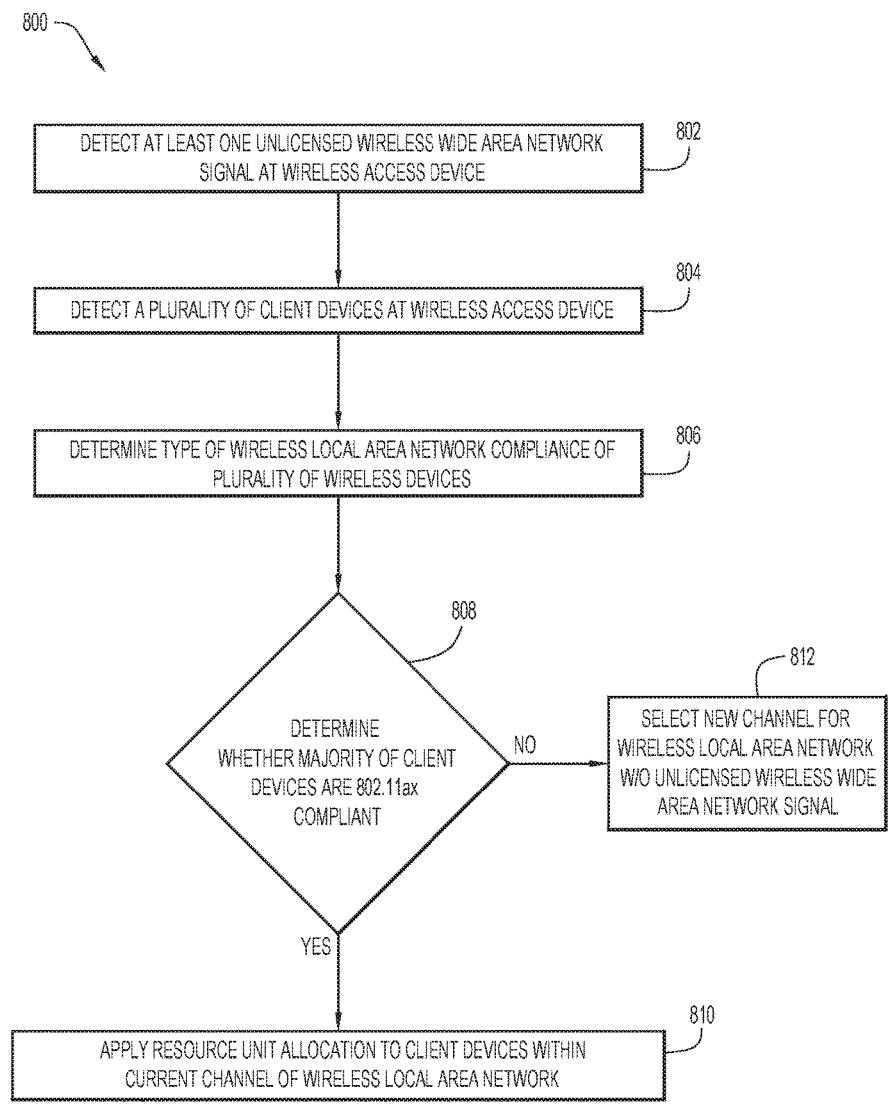
FIG. 8 is a flowchart of a method for determining channelization based on type of wireless local area network compliance of connected client devices, according to an example embodiment.

FIG. 8 is a flowchart of a method 800 for determining channelization based on type of wireless local area network compliance of connected client devices, according to an example embodiment. In this embodiment, method 800 may be implemented by wireless access device 110. Method 800 may begin with an operation 802, where the wireless access device 110 that is operating a wireless local area network detects at least one unlicensed wireless wide area network signal. Next, at an operation 804, a plurality of client devices in communication with wireless access device 110 are detected. For example, as described above with reference to FIG. 7, wireless access device 110 may detect first client device 112, second client device 114, third client device 116, fourth client device 700, and fifth client device 702.

At an operation 806, a type of wireless local area network compliance for each of the plurality of client devices is determined. For example, wireless access device 110 may determine that each of first client device 112, second client device 114, and third client device 116 are IEEE 802.11ax standard compliant devices, fourth client device 700 is complaint with the IEEE 802.11n standard, and fifth client device 702 is complaint with the IEEE 802.11ac standard.

Next, at an operation 808, method 800 includes determining whether a majority of the plurality of client devices are IEEE 802.11ax compliant or not. Upon determining that a majority of the plurality of client devices are IEEE 802.11ax compliant at operation 808, method 800 proceeds to an operation 810. At operation 810, resource unit allocation techniques are applied to the plurality of client devices within a current channel of the wireless local area network. For example, in FIG. 7 the majority of client devices 112, 114, 116, 700, 702 are IEEE 802.11ax compliant (i.e., first group 710 of IEEE 802.11ax compliant devices includes 3 devices compared to second group 720 of non-IEEE 802.11ax compliant devices that includes only 2 devices). Accordingly, because the plurality of client devices are IEEE 802.11ax compliant, then resource unit allocation techniques, such as described above with reference to FIGS. 3-6, may be effectively implemented.

Alternatively, upon determining that a majority of the plurality of client devices are not IEEE 802.11ax compliant at operation 808, method 800 may instead proceed to an operation 812. At operation 812, a new channel is selected for the wireless local area network that does not include frequencies associated with the at least one unlicensed wireless wide area network signal. That is, in this situation, because the plurality of client devices are not IEEE 802.11ax compliant, then resource unit allocation techniques may not be effective. Thus, the new channel is selected to avoid interference signals with the unlicensed wireless wide area network.

Additionally, in one embodiment, operations of method 800 may be implemented in combination with method 600 above. For example, in one embodiment, prior to implementing operations 614 and 616 of method 600 above, a type of wireless local area network compliance for each of the detected client devices is determined. If a majority of the plurality of client devices are IEEE 802.11ax standard compliant, then method 600 may proceed to operations 614 and 616 where resource units are assigned to each group of devices.

Aggressive Tuning in Presence of Unlicensed Signals

According to another example embodiment, a wireless access point (e.g., wireless access device 110) may be configured to detect interference signals and implement techniques for aggressively tuning wireless local area network signals in the presence of weak unlicensed wireless wide area network signals.

Figure 9:
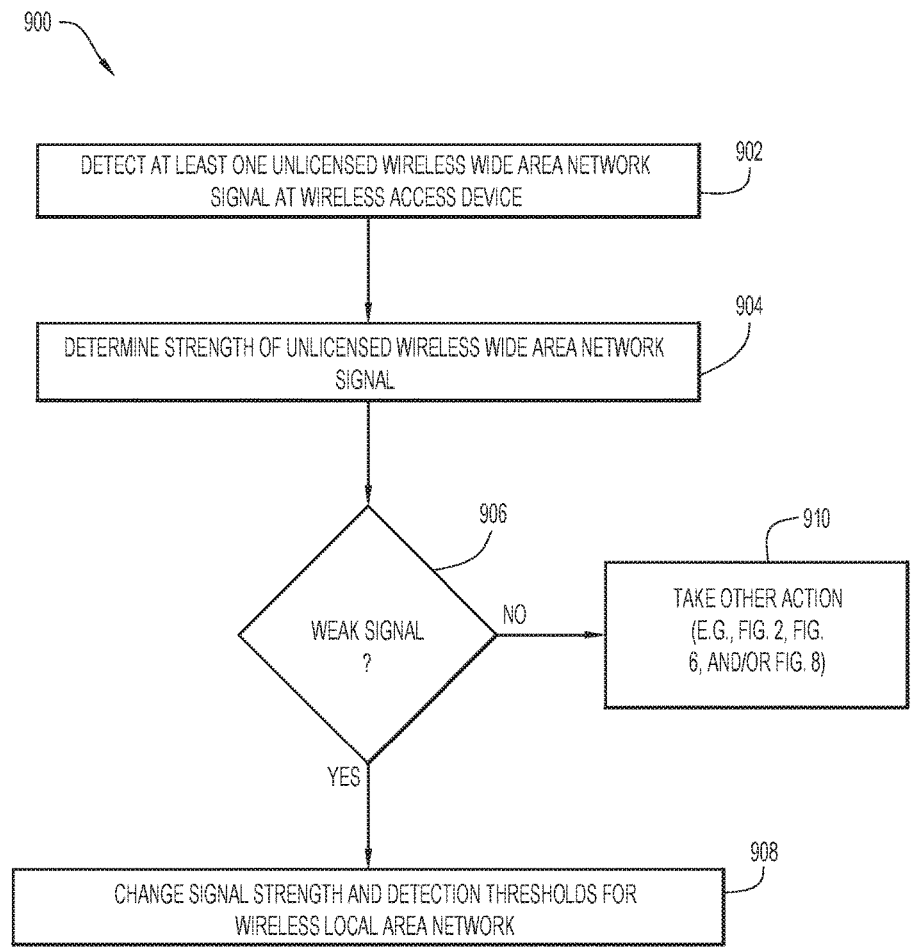
FIG. 9 is a flowchart of a method of aggressive channel contention by wireless local area network signals in the presence of weak interference, according to an example embodiment.

Referring now to FIG. 9, a flowchart of a method 900 of aggressive channel contention by wireless local area network signals in the presence of weak interference signals is illustrated according to an example embodiment. In one embodiment, method 900 may be implemented by a wireless access point, for example, wireless access device 110, described above. Method 900 may begin with an operation 902 where a wireless access device operating a wireless local area network detects at least one unlicensed wireless wide area network signal. Next, at an operation 904, a strength of the at least one unlicensed wireless wide area network signal is determined. At an operation 906, the wireless access device (e.g., wireless access device 110) determines whether or not the detected unlicensed wireless wide area network signal is a weak signal. For example, signal strength (e.g., RSSI), signal quality (e.g., proxy for SNR), and/or duty cycle may be used to determine whether the detected unlicensed wireless wide area network signal is a weak signal. In an example embodiment, a signal strength value (e.g., RSSI) of the detected unlicensed wireless wide area network signal may be compared with a predetermined threshold, which may be measured in dBm.

Upon determining at operation 906 that the unlicensed wireless wide area network signal is a weak signal, then method 900 may proceed to an operation 908. At operation 908, the wireless access device (e.g., wireless access device 110) may change at least one of signal strength and detection thresholds for the wireless local area network in order to more aggressively contend with the unlicensed wireless wide area network signal on a channel. For example, operation 908 may include changing one or more of Receiver Start of Packet Detection (Rx SOP) threshold and/or Clear Channel Assessment (CCA) threshold of the wireless local area network to be more aggressive in the presence of the unlicensed wireless wide area network signals. That is, operation 908 adjusts the thresholds at which the wireless local area network will contend for a wireless channel in the presence of unlicensed wireless wide area network signals instead of changing to a new channel. Additionally, in environments where listen-before-talk (LBT) is not mandatory, operation 908 may also include changing or clearing the CCA mechanism to be more aggressive, for example, by changing an energy detection threshold to the minimum required value (e.g., −62 dBm). In this manner, the wireless local area network signals may be configured to avoid yielding to the interference from the unlicensed wireless wide area network signals.

Upon determining at operation 906 that the unlicensed wireless wide area network signal is not a weak signal, however, then method 900 may proceed instead to an operation 910. At operation 910, a different action may be taken by the wireless access device (e.g., wireless access device 110) to mitigate the interference from the unlicensed wireless wide area network signals. For example, actions may include any one or more of the example embodiments described herein, including any of the techniques described in reference to FIGS. 1 through 8 above.

According to this example embodiment, method 900 may change the Rx SOP threshold and/or CCA threshold of the wireless local area network to avoid backing off to an unlicensed wireless wide area network in scenarios where the interference signals are weak enough such that the wireless access device can still successfully downlink to client devices while colliding with the interference signals from the unlicensed wireless wide area network. Additionally, in some embodiments, the signal strength and detection thresholds for the wireless local area network (e.g., Rx SOP threshold and/or CCA threshold) may be changed to be more aggressive during predetermined time periods. For example, time periods when the interference signals from the unlicensed wireless wide area network are predicted or determined to be on/present. Similarly, during time periods when the interference signals from the unlicensed wireless wide area network are predicted or determined to be off/absent, the signal strength and detection thresholds for the wireless local area network may return to default values.

Figure 10:
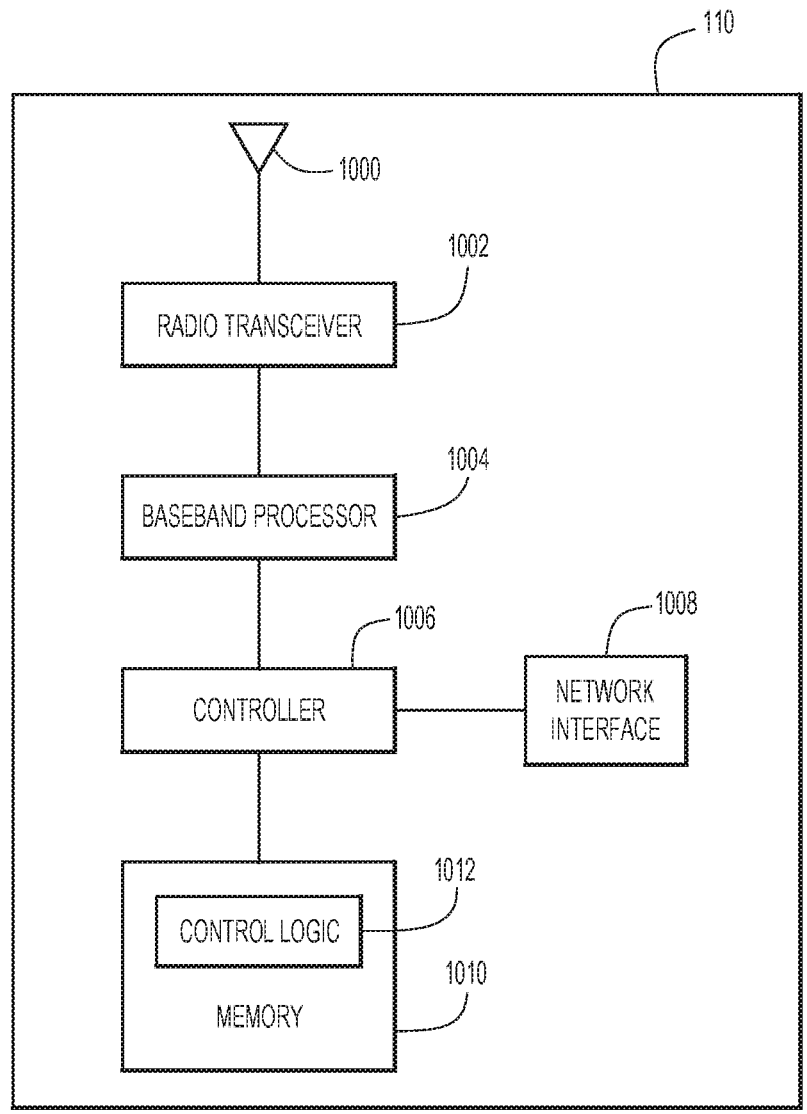
FIG. 10 is a block diagram of a wireless access device in which the operations for channelization of a wireless communication network in the presence of interference may be implemented, according to an example embodiment.

FIG. 10 illustrates an example block diagram of a wireless access device (e.g., wireless access device 110) that may be configured to implement techniques for enhanced channelization of a wireless communication network (e.g., a wireless local area network) in the presence of interference from unlicensed wireless wide area network signals, according to the principles of the embodiments described herein.

In this embodiment, wireless access device 110 may include an antenna 1000, a radio transceiver 1002, a baseband processor (modem) 1004, a controller (microprocessor or microcontroller) 1006, a wired network interface 1008, and memory 1010 that stores instructions for control logic 1012. Wireless access device 110 may have multiple antennas and the radio transceiver 1002 may have multiple transmitters and receivers, one for each antenna. The radio transceiver 1002 performs down converting to baseband of received radio frequency (RF) signals and up converting to RF of baseband transmit signals. The baseband processor 1004 performs baseband modulation to produce baseband transmit signals and baseband demodulation of received baseband receive signals. The baseband processor 1004 may also perform various media access control (MAC) functions. The radio transceiver 1002 and baseband processor 1004 may be embodied as part of integrated circuit (IC) chipsets that are compliant with IEEE 802.11, for example.

The controller 1006 performs higher-level control of the wireless access device 110 and to this end executes instructions for the control logic 1012 stored in memory 1010. The network interface 1008 is a network interface card (NIC) that enables wired network communication via a LAN (not shown) or other network connections. Control logic 1012 may be configured to implement one or more functions of wireless access device 110, including DCA and/or operations associated with the channelization techniques of the present embodiments described in reference to FIGS. 1 through 9 above.

The example embodiments provide new channelization schemes that mitigate co-channel contention from unlicensed wireless wide area networks. The principles of the example embodiments described herein can also conduct frequency and resource unit optimization based on unlicensed wireless wide area network signal proximity and client device presence.

In summary, a method is provided comprising: detecting, at a wireless access device operating a wireless local area network, at least one unlicensed wireless wide area network signal; determining, based on information associated with a preamble of the at least one unlicensed wireless wide area network signal, a bandwidth of the at least one unlicensed wireless wide area network signal; selecting a wireless channel for the wireless local area network that includes frequencies associated with the at least one unlicensed wireless wide area network signal, wherein the wireless channel is associated with a channel bandwidth that is greater than or equal to the bandwidth of the at least one unlicensed wireless wide area network signal; allocating a first portion of the wireless channel to a first plurality of resource units, the first portion of the wireless channel including frequencies associated with the at least one unlicensed wireless wide area network signal and having a first bandwidth that is greater than or equal to the bandwidth of the at least one unlicensed wireless wide area network signal; allocating a second portion of the wireless channel to a second plurality of resource units, the second portion of the wireless channel excluding frequencies associated with the at least one unlicensed wireless wide area network signal and having a second bandwidth, wherein the second bandwidth is less than or equal to a difference between the channel bandwidth and the first bandwidth; detecting a plurality of client devices in communication with the wireless access device; assigning the first plurality of resource units to a first group of the plurality of client devices to exchange data using the first portion of the wireless channel; and assigning the second plurality of resource units to a second group of the plurality of client devices to exchange data using the second portion of the wireless channel.

In another form, a non-transitory computer readable storage media encoded with instructions is provided that, when executed by a processor, causes the processor to: detect at least one unlicensed wireless wide area network signal; determine, based on information associated with a preamble of the at least one unlicensed wireless wide area network signal, a bandwidth of the at least one unlicensed wireless wide area network signal; select a wireless channel for the wireless local area network that includes frequencies associated with the at least one unlicensed wireless wide area network signal, wherein the wireless channel is associated with a channel bandwidth that is greater than or equal to the bandwidth of the at least one unlicensed wireless wide area network signal; allocate a first portion of the wireless channel to a first plurality of resource units, the first portion of the wireless channel including frequencies associated with the at least one unlicensed wireless wide area network signal and having a first bandwidth that is greater than or equal to the bandwidth of the at least one unlicensed wireless wide area network signal; allocate a second portion of the wireless channel to a second plurality of resource units, the second portion of the wireless channel excluding frequencies associated with the at least one unlicensed wireless wide area network signal and having a second bandwidth, wherein the second bandwidth is less than or equal to a difference between the channel bandwidth and the first bandwidth; detect a plurality of client devices in communication with the wireless access device; assign the first plurality of resource units to a first group of the plurality of client devices to exchange data using the first portion of the wireless channel; and assign the second plurality of resource units to a second group of the plurality of client devices to exchange data using the second portion of the wireless channel.

Furthermore, an apparatus is provided comprising: a transceiver configured to transmit and receive signals in a wireless local area network; a modem coupled to the transceiver and configured to modulate signals and demodulate signals; a processor coupled to the modem and to the transceiver, wherein the processor is configured to: detect at least one unlicensed wireless wide area network signal; determine, based on information associated with a preamble of the at least one unlicensed wireless wide area network signal, a bandwidth of the at least one unlicensed wireless wide area network signal; select a wireless channel for the wireless local area network that includes frequencies associated with the at least one unlicensed wireless wide area network signal, wherein the wireless channel is associated with a channel bandwidth that is greater than or equal to the bandwidth of the at least one unlicensed wireless wide area network signal; allocate a first portion of the wireless channel to a first plurality of resource units, the first portion of the wireless channel including frequencies associated with the at least one unlicensed wireless wide area network signal and having a first bandwidth that is greater than or equal to the bandwidth of the at least one unlicensed wireless wide area network signal; allocate a second portion of the wireless channel to a second plurality of resource units, the second portion of the wireless channel excluding frequencies associated with the at least one unlicensed wireless wide area network signal and having a second bandwidth, wherein the second bandwidth is less than or equal to a difference between the channel bandwidth and the first bandwidth; detect a plurality of client devices in communication with the wireless access device; assign the first plurality of resource units to a first group of the plurality of client devices to exchange data using the first portion of the wireless channel; and assign the second plurality of resource units to a second group of the plurality of client devices to exchange data using the second portion of the wireless channel.

In another embodiment, a method is provided comprising: detecting, at a wireless access device operating a wireless local area network, at least one interference signal; determining whether the interference signal is an unlicensed wireless wide area network signal; upon determining that the interference signal is an unlicensed wireless wide area network signal, applying a positive bias to sets of frequencies associated with dynamic frequency selection channels; or upon determining that the interference signal is not an unlicensed wireless wide area network signal, applying a negative bias to sets of frequencies associated with dynamic frequency selection channels; and selecting a wireless local area network channel from the set of available frequencies.

In another embodiment, a non-transitory computer readable storage media encoded with instructions is provided that, when executed by a processor, causes the processor to: detect, at a wireless access device operating a wireless local area network, at least one interference signal; determine whether the interference signal is an unlicensed wireless wide area network signal; upon determining that the interference signal is an unlicensed wireless wide area network signal, apply a positive bias to sets of frequencies associated with dynamic frequency selection channels; or upon determining that the interference signal is not an unlicensed wireless wide area network signal, apply a negative bias to sets of frequencies associated with dynamic frequency selection channels; and select a wireless local area network channel from the set of available frequencies.

Furthermore, in another embodiment, an apparatus is provided comprising: a transceiver configured to transmit and receive signals in a wireless local area network; a modem coupled to the transceiver and configured to modulate signals and demodulate signals; a processor coupled to the modem and to the transceiver, wherein the processor is configured to: detect at least one interference signal; determine whether the interference signal is an unlicensed wireless wide area network signal; upon determining that the interference signal is an unlicensed wireless wide area network signal, apply a positive bias to sets of frequencies associated with dynamic frequency selection channels; or upon determining that the interference signal is not an unlicensed wireless wide area network signal, apply a negative bias to sets of frequencies associated with dynamic frequency selection channels; and select a wireless local area network channel from the set of available frequencies.

In another embodiment, a method is provided comprising: detecting, at a wireless access device operating a wireless local area network, at least one unlicensed wireless wide area network signal; detecting a plurality of client devices in communication with the wireless access device; determining a type of wireless local area network compliance for each of the plurality of client devices; determining whether a majority of the plurality of client devices are IEEE 802.11ax compliant; upon determining that a majority of the plurality of client devices are IEEE 802.11ax compliant, applying resource unit allocation to the plurality of client devices within a current channel of the wireless local area network; or upon determining that a majority of the plurality of client devices are not IEEE 802.11ax compliant, selecting a new channel for the wireless local area network that does not include frequencies associated with the at least one unlicensed wireless wide area network signal.

In another embodiment, a non-transitory computer readable storage media encoded with instructions is provided that, when executed by a processor, causes the processor to: detect, at a wireless access device operating a wireless local area network, at least one unlicensed wireless wide area network signal; detect a plurality of client devices in communication with the wireless access device; determine a type of wireless local area network compliance for each of the plurality of client devices; determine whether a majority of the plurality of client devices are IEEE 802.11ax compliant; upon determining that a majority of the plurality of client devices are IEEE 802.11ax compliant, apply resource unit allocation to the plurality of client devices within a current channel of the wireless local area network; or upon determining that a majority of the plurality of client devices are not IEEE 802.11ax compliant, select a new channel for the wireless local area network that does not include frequencies associated with the at least one unlicensed wireless wide area network signal.

Furthermore, in another embodiment, an apparatus is provided comprising: a transceiver configured to transmit and receive signals in a wireless local area network; a modem coupled to the transceiver and configured to modulate signals and demodulate signals; a processor coupled to the modem and to the transceiver, wherein the processor is configured to: detect at least one unlicensed wireless wide area network signal; detect a plurality of client devices in communication with the apparatus; determine a type of wireless local area network compliance for each of the plurality of client devices; determine whether a majority of the plurality of client devices are IEEE 802.11ax compliant; upon determining that a majority of the plurality of client devices are IEEE 802.11ax compliant, apply resource unit allocation to the plurality of client devices within a current channel of the wireless local area network; or upon determining that a majority of the plurality of client devices are not IEEE 802.11ax compliant, select a new channel for the wireless local area network that does not include frequencies associated with the at least one unlicensed wireless wide area network signal.

In another embodiment, a method is provided comprising: detecting, at a wireless access device operating a wireless local area network, at least one unlicensed wireless wide area network signal; determining a strength of the at least one unlicensed wireless wide area network signal; determining whether the at least one unlicensed wireless wide area network signal is a weak signal; and upon determining that the at least one unlicensed wireless wide area network signal is a weak signal, changing at least one of signal strength and detection thresholds for the wireless local area network.

In another embodiment, a non-transitory computer readable storage media encoded with instructions is provided that, when executed by a processor, causes the processor to: detect, at a wireless access device operating a wireless local area network, at least one unlicensed wireless wide area network signal; determine a strength of the at least one unlicensed wireless wide area network signal; determine whether the at least one unlicensed wireless wide area network signal is a weak signal; and upon determining that the at least one unlicensed wireless wide area network signal is a weak signal, change at least one of signal strength and detection thresholds for the wireless local area network.

Furthermore, in another embodiment, an apparatus is provided comprising: a transceiver configured to transmit and receive signals in a wireless local area network; a modem coupled to the transceiver and configured to modulate signals and demodulate signals; a processor coupled to the modem and to the transceiver, wherein the processor is configured to: detect at least one unlicensed wireless wide area network signal; determine a strength of the at least one unlicensed wireless wide area network signal; determine whether the at least one unlicensed wireless wide area network signal is a weak signal; and upon determining that the at least one unlicensed wireless wide area network signal is a weak signal, change at least one of signal strength and detection thresholds for the wireless local area network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    detecting, at a wireless access device operating a wireless local area network, at least one unlicensed wireless wide area network signal;
    determining, based on information associated with a preamble of the at least one unlicensed wireless wide area network signal, a bandwidth of the at least one unlicensed wireless wide area network signal;
    selecting a wireless channel for the wireless local area network that includes frequencies associated with the at least one unlicensed wireless wide area network signal, wherein the wireless channel is associated with a channel bandwidth that is greater than or equal to the bandwidth of the at least one unlicensed wireless wide area network signal;
    allocating a first portion of the wireless channel to a first plurality of resource units, the first portion of the wireless channel including frequencies associated with the at least one unlicensed wireless wide area network signal and having a first bandwidth that is greater than or equal to the bandwidth of the at least one unlicensed wireless wide area network signal;
    allocating a second portion of the wireless channel to a second plurality of resource units, the second portion of the wireless channel excluding frequencies associated with the at least one unlicensed wireless wide area network signal and having a second bandwidth, wherein the second bandwidth is less than or equal to a difference between the channel bandwidth and the first bandwidth;
    detecting a plurality of client devices in communication with the wireless access device;
    separating the plurality of client devices into a first group of client devices that will contend with the at least one unlicensed wireless wide area network signal and a second group of client devices that will not contend with the at least one unlicensed wireless wide area network signal;
    assigning the first plurality of resource units to the first group of client devices to exchange data using the first portion of the wireless channel; and
    mitigating co-channel contention for the second group of client devices by assigning the second plurality of resource units to the second group of client devices to exchange data using the second portion of the wireless channel.

2. The method of claim 1, wherein the second group of client devices have higher capacity requirements than the first group of client devices.

3. The method of claim 1, wherein the information associated with the preamble of the at least one unlicensed wireless wide area network signal includes one or more of signal strength, signal quality, or estimated duty cycle of the at least one unlicensed wireless wide area network signal.

4. The method of claim 3, wherein determining the bandwidth of the at least one unlicensed wireless wide area network signal comprises determining the bandwidth based on the signal quality and the estimated duty cycle.

5. The method of claim 1, wherein the channel bandwidth is 40 MHz, 80 MHz, or 160 MHz.

6. The method of claim 5, wherein the first bandwidth is at least 10 MHz and up to 20 MHz.

7. The method of claim 1, further comprising determining that a majority of the plurality of client devices are IEEE 802.11ax standard compliant prior to assigning the first plurality of resource units and the second plurality of resource units.

8. One or more non-transitory computer readable storage media encoded with instructions that, when executed by a processor of a wireless access device operating a wireless local area network, cause the processor to:
    detect at least one unlicensed wireless wide area network signal;
    determine, based on information associated with a preamble of the at least one unlicensed wireless wide area network signal, a bandwidth of the at least one unlicensed wireless wide area network signal;
select a wireless channel for the wireless local area network that includes frequencies associated with the at least one unlicensed wireless wide area network signal, wherein the wireless channel is associated with a channel bandwidth that is greater than or equal to the bandwidth of the at least one unlicensed wireless wide area network signal;
allocate a first portion of the wireless channel to a first plurality of resource units, the first portion of the wireless channel including frequencies associated with the at least one unlicensed wireless wide area network signal and having a first bandwidth that is greater than or equal to the bandwidth of the at least one unlicensed wireless wide area network signal;
allocate a second portion of the wireless channel to a second plurality of resource units, the second portion of the wireless channel excluding frequencies associated with the at least one unlicensed wireless wide area network signal and having a second bandwidth, wherein the second bandwidth is less than or equal to a difference between the channel bandwidth and the first bandwidth;
detect a plurality of client devices in communication with the wireless access device;
separate the plurality of client devices into a first group of client devices that will contend with the at least one unlicensed wireless wide area network signal and a second group of client devices that will not contend with the at least one unlicensed wireless wide area network signal;
assign the first plurality of resource units to the first group of client devices to exchange data using the first portion of the wireless channel; and
mitigate co-channel contention for the second group of client devices by assigning the second plurality of resource units to the second group of client devices to exchange data using the second portion of the wireless channel.

9. The one or more non-transitory computer readable storage media of claim 8, wherein the second group of client devices have higher capacity requirements than the first group of client devices.

10. The one or more non-transitory computer readable storage media of claim 8, wherein the information associated with the preamble of the at least one unlicensed wireless wide area network signal includes one or more of signal strength, signal quality, or estimated duty cycle of the at least one unlicensed wireless wide area network signal.

11. The one or more non-transitory computer readable storage media of claim 10, wherein determining the bandwidth of the at least one unlicensed wireless wide area network signal comprises determining the bandwidth based on the signal quality and the estimated duty cycle.

12. The one or more non-transitory computer readable storage media of claim 8, wherein the channel bandwidth is 40 MHz, 80 MHz, or 160 MHz.

13. The one or more non-transitory computer readable storage media of claim 12, wherein the first bandwidth is at least 10 MHz and up to 20 MHz.

14. The one or more non-transitory computer readable storage media of claim 8, further comprising instructions to cause the processor to:
determine that a majority of the plurality of client devices are IEEE 802.11ax standard compliant prior to assigning the first plurality of resource units and the second plurality of resource units.

15. An apparatus comprising:
a transceiver configured to transmit and receive signals in a wireless local area network;
a modem coupled to the transceiver and configured to modulate signals and demodulate signals;
a processor coupled to the modem and to the transceiver, wherein the processor is configured to:
detect at least one unlicensed wireless wide area network signal;
determine, based on information associated with a preamble of the at least one unlicensed wireless wide area network signal, a bandwidth of the at least one unlicensed wireless wide area network signal;
select a wireless channel for the wireless local area network that includes frequencies associated with the at least one unlicensed wireless wide area network signal, wherein the wireless channel is associated with a channel bandwidth that is greater than or equal to the bandwidth of the at least one unlicensed wireless wide area network signal;
allocate a first portion of the wireless channel to a first plurality of resource units, the first portion of the wireless channel including frequencies associated with the at least one unlicensed wireless wide area network signal and having a first bandwidth that is greater than or equal to the bandwidth of the at least one unlicensed wireless wide area network signal;
allocate a second portion of the wireless channel to a second plurality of resource units, the second portion of the wireless channel excluding frequencies associated with the at least one unlicensed wireless wide area network signal and having a second bandwidth, wherein the second bandwidth is less than or equal to a difference between the channel bandwidth and the first bandwidth;
detect a plurality of client devices in communication with the wireless access device;
separate the plurality of client devices into a first group of client devices that will contend with the at least one unlicensed wireless wide area network signal and a second group of client devices that will not contend with the at least one unlicensed wireless wide area network signal;
assign the first plurality of resource units to the first group of client devices to exchange data using the first portion of the wireless channel; and
mitigate co-channel contention for the second group of client devices by assigning the second plurality of resource units to the second group of client devices to exchange data using the second portion of the wireless channel.

16. The apparatus of claim 15, wherein the second group of client devices have higher capacity requirements than the first group of client devices.

17. The apparatus of claim 15, wherein the information associated with the preamble of the at least one unlicensed wireless wide area network signal includes one or more of signal strength, signal quality, or estimated duty cycle of the at least one unlicensed wireless wide area network signal.

18. The apparatus of claim 17, wherein determining the bandwidth of the at least one unlicensed wireless wide area network signal comprises determining the bandwidth based on the signal quality and the estimated duty cycle.

19. The apparatus of claim 15, wherein the channel bandwidth is 40 MHz, 80 MHz, or 160 MHz; and
wherein the first bandwidth is at least 10 MHz and up to 20 MHz.

20. The apparatus of claim 15, wherein the processor is further configured to: determine that a majority of the plurality of client devices are IEEE 802.11ax standard compliant prior to assigning the first plurality of resource units and the second plurality of resource units.

* * * * *